United States Patent
Elzink (10) Patent No.: US 9,695,971 B2
(45) Date of Patent: Jul. 4, 2017

(54) DEVICE AND METHOD FOR INSTALLING A COMPACT PIPE WITHIN A PIPELINE

(71) Applicant: Wavin B.V., CW Zwolle (NL)

(72) Inventor: Willem Johan Elzink, Ld Dedemsvaart (NL)

(73) Assignee: Wavin B.V., CW Zwolle (NL)

( * ) Notice: Subject to any disclaimer, the term of this patent is extended or adjusted under 35 U.S.C. 154(b) by 260 days.

(21) Appl. No.: 14/388,897

(22) PCT Filed: Mar. 22, 2013

(86) PCT No.: PCT/EP2013/056063
§ 371 (c)(1),
(2) Date: Sep. 29, 2014

(87) PCT Pub. No.: WO2013/144010
PCT Pub. Date: Oct. 3, 2013

(65) Prior Publication Data
US 2015/0053295 A1    Feb. 26, 2015

(30) Foreign Application Priority Data
Mar. 29, 2012  (NL) ................................. 1039503

(51) Int. Cl.
*F16L 55/165* (2006.01)
*F16L 55/18* (2006.01)

(52) U.S. Cl.
CPC ......... *F16L 55/165* (2013.01); *F16L 55/1654* (2013.01); *F16L 55/18* (2013.01)

(58) Field of Classification Search
CPC combination set(s) only.
See application file for complete search history.

(56) References Cited

U.S. PATENT DOCUMENTS

| | | | |
|---|---|---|---|
| 4,637,756 A | 1/1987 | Boles | |
| 5,651,639 A | 7/1997 | Wentworth et al. | |
| 6,305,880 B1 | 10/2001 | Carter et al. | |
| 6,723,266 B1 | 4/2004 | Lippiatt | |
| 2004/0218982 A1 | 11/2004 | Wentworth | |
| 2007/0012373 A1* | 1/2007 | Driver | B29C 63/34 138/97 |
| 2011/0236138 A1* | 9/2011 | Cosban | F16L 55/1108 405/184.2 |

FOREIGN PATENT DOCUMENTS

| | | | | |
|---|---|---|---|---|
| GB | 807413 A | | 1/1959 | |
| GB | 2 032 043 A | | 4/1980 | |
| GB | 2320952 A | | 7/1998 | |
| GB | 2482132 A | * | 1/2012 | ............ E21B 7/205 |

(Continued)

OTHER PUBLICATIONS

International Search Report and Written Opinion from International Application No. PCT/EP2013/056063 mailed Jul. 24, 2013.

*Primary Examiner* — Kyle Armstrong
(74) *Attorney, Agent, or Firm* — Wolf, Greenfield & Sacks, P.C.

(57) ABSTRACT

A device for installing a compact pipe (CP) within a pipeline includes an adapter (4) comprising means for releasably connecting a connecting piece to the adapter (4), and means for fixing the adapter (4) to a first end of the compact pipe (CP).

18 Claims, 5 Drawing Sheets (56) References Cited

FOREIGN PATENT DOCUMENTS

| JP | S55-051531 A | 4/1980 |
|---|---|---|
| JP | H11-230473 A | 8/1999 |
| JP | 2003-291216 A | 10/2003 |
| JP | 2009-156306 A | 7/2009 |
| WO | WO 95/32381 A1 | 11/1995 |
| WO | WO 98/55796 A1 | 12/1998 |
| WO | WO 02/064351 A2 | 8/2002 |

* cited by examiner

DEVICE AND METHOD FOR INSTALLING A COMPACT PIPE WITHIN A PIPELINE

CROSS-REFERENCE TO RELATED APPLICATIONS

This application is a national stage filing under 35 U.S.C. §371 of International Application No. PCT/EP2013/056063, filed Mar. 22, 2013, which claims priority to Netherlands Application No. 1039503, filed Mar. 29, 2012.

TECHNICAL FIELD

The present invention relates to a device and a method for installing a compact pipe (CP) within a pipeline, as well as a method for preparing a compact pipe (CP) for being installed within a pipeline.

Such compact pipes or CPs are used for the renovation of both non-pressure and pressure pipelines, such as sewers, water supply lines, gas supply lines and industrial lines. The compact pipes or CPs are introduced into the existing, defective pipelines such so as to line the pipelines from inside and restore them to their former function.

PRIOR ART

Figure 7:
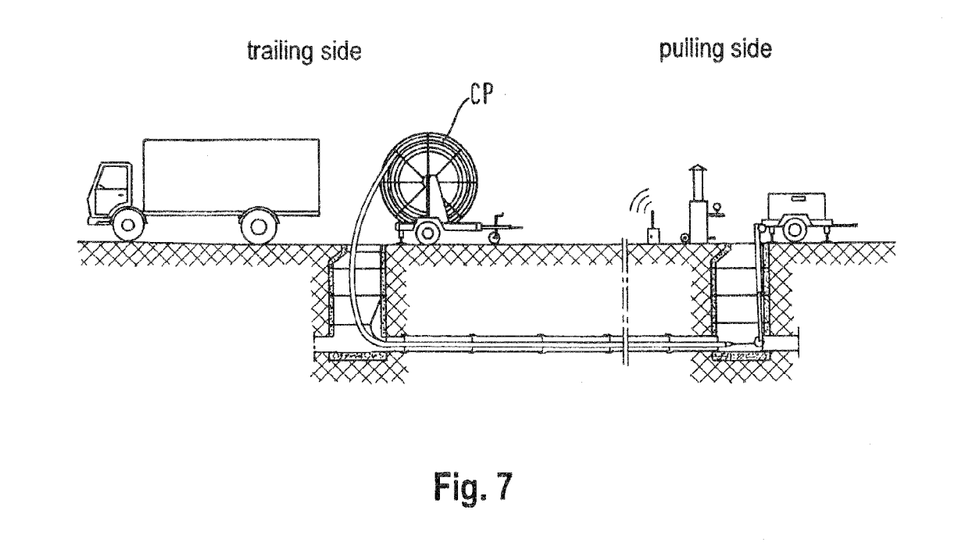
FIG. 7 shows an installation site where a compact pipe (CP) is introduced into an existing, defective pipeline.

FIG. 7 shows an installation site where a compact pipe (CP) is introduced into an existing, defective pipeline ("old pipe").

The compact pipe originally has a circular cross section. In a manner known as such, the CP has, however, been folded along its length during the extrusion process so as to obtain a modified cross sectional shape which is non-circular. The cross section of the original circular pipe is reduced thereby. This is done in order to allow the CP to be more easily inserted into the damaged pipeline. For example, the modified cross sectional shape of the CP in the folded state resembles the shape of a heart or the capital letter C. The material used for the CP has a memory characteristic or effect so that the CP, after placing it within the damaged pipeline, can be brought back into the original circular cross-sectional shape by heating it, e.g. with steam.

As shown in FIG. 7, the CP is delivered on a drum, inserted into an insertion manhole and pulled into the damaged pipeline with the aid of a winch placed in the area of a target manhole.

Applicant developed a system for installing such compact pipes, which has become known as the Wavin Compact Pipe system. In this conventional system, to pull the CP through the pipeline, a pulling head is mounted to the free end (the pulling end) of the CP, and the winch cable is connected to the pulling head.

Figure 8:
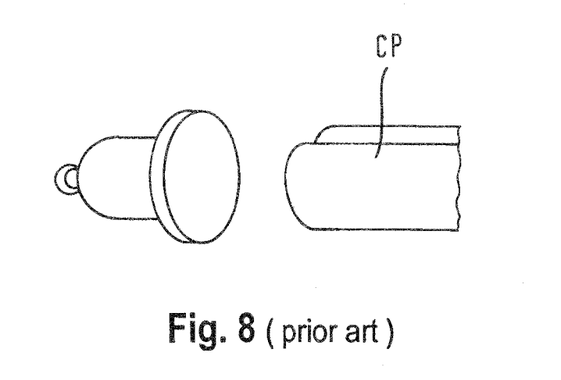
FIGS. 8 and 9 show a prior art pulling head for installing a CP.
Figure 9:
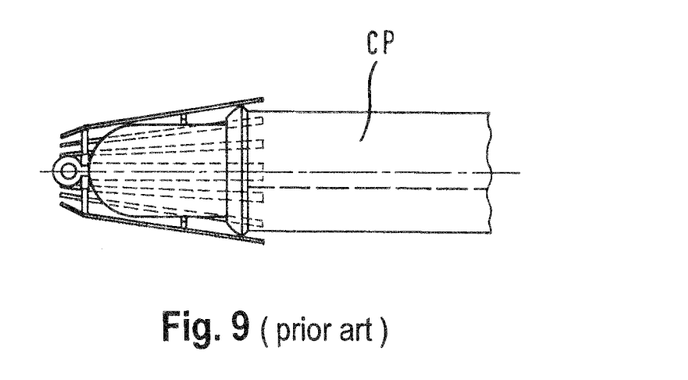

FIGS. 8 and 9 show a corresponding prior art arrangement, in which a plate made from PE (polyethylene) is fixed between the pulling end of the CP and the pulling head. FIG. 9 additionally shows a pulling head protection and guidance which is conventionally used.

After pulling the CP through the damaged pipeline by means of the winch, the CP is cut off at the starting point. Onto the cut-off (trailing) end of the CP, another PE-plate is fusion joined, and steam inlets are drilled or cut into the trailing end PE-plate.

On the pulling side, where the pulling head is mounted, a steam outlet is created by drilling either into the pulling head or in the pipe and connecting a water/steam separator. Subsequently, steam is applied to the inside of the CP so as to make it revert to its original shape. Finally, the CP is cooled with the aid of compressed air, and the tools are cut off. Thanks to the inserted CP, which fits close to the inner wall of the pipeline, the pipeline has become fully functional again and can be re-connected to the existing network. Pipelines renovated with compact pipes have a quality equal to newly installed pipelines.

The method described above has some disadvantages. One of them is the time needed for fusion joining the PE-plates against the pulling and trailing ends of the CP. In order to do that, the PE-plates have to be heated in their entirety. This takes between about 30 and 60 minutes. On the pulling side, this can be done the evening before the actual installation of the CP, but not on the trailing side because at that time the trailing end of the CP has not been cut yet.

Another disadvantage is caused by the openings which are drilled or cut into the PE-plates. These openings are relatively small, and during steam exposure the openings are becoming even smaller because the material of the PE-plates melts.

DISCLOSURE OF THE INVENTION

The object underlying the present invention is to provide a device and a method by means of which the installation of a CP into an existing pipeline is facilitated.

This object is solved, on the one hand, by a device for installing a CP within a pipeline comprising the features of claim 1. The device includes an adapter comprising means for releasably connecting a connecting piece to the adapter, and means for fixing the adapter to a first end of the compact pipe.

Other than in the prior art, where the pulling head was non-detachably fixed to the pulling end of the CP by fusion joining and cut off after the installation was completed, the adapter of the present invention allows a multitude of different connecting pieces to be releasably connected with the end of the CP. The connecting pieces can have an arbitrary shape and function.

In particular, during installation of the CP, a pulling head can be connected to the adapter, used for pulling the CP into the damaged pipeline, and subsequently disconnected again from the adapter. A fluid inlet/outlet piece can then be connected to the adapter in order to introduce steam into the CP and expand the CP into its original, circular cross-sectional shape, and to subsequently introduce compressed air into the CP for cooling purposes.

The installation of the CP is largely facilitated thereby, and the problems associated with the prior art systems discussed above are alleviated.

Preferred optional features of the claimed device are recited in the dependent device claims.

The means for releasably attaching a connecting piece may for example include a screw thread, in order to allow the connecting pieces to be connected to the adapter in a particularly simple manner. In particular, when the adapter has the shape of a hollow cylinder, the means for releasably attaching a connecting piece are suitably constituted by an internal thread on at least part of the inner circumferential surface of the adapter. The connecting pieces must then have a thread mating with the internal thread formed in the adapter.

The adapter could be directly fixed to the end of the CP or via at least one intermediate element. In a preferred embodiment, a first one of the intermediate elements is preferably provided in the form of a sleeve. Where the sleeve and the adapter are cylindrical, the adapter is suitably concentrically inserted into the sleeve. The first intermediate element or sleeve may be fixed to the first end of the compact pipe either directly or via a second intermediate element which in turn is attached to the first end of the compact pipe. Such a second intermediate element is preferably provided in the form of a plate contacting the circular end face of the sleeve.

Since it is intended to supply fluids such as steam and compressed air into the CP via the adapter, as will be explained below, the adapter and the means for connecting the adapter with the CP are preferably constructed so as to allow a communication between the interior of the adapter with the interior of the compact pipe. In the embodiment comprising the plate, the plate is suitably formed with an opening. The opening should be made as large as possible and therefore preferably has a shape which substantially corresponds to the open area of the cross section of the folded compact pipe.

According to a particularly preferred embodiment of the invention, one of the intermediate elements is provided in the form of a compact pipe segment which in turn is arranged and constructed for being fixed to the first end of the compact pipe. At the installation site, the device can then simply be coupled with the compact pipe to be installed by attaching the free end of the CP segment to the free end of the compact pipe. This is preferably done by fusion joining. The compact pipe segment is preferably constructed so as to have the same cross section as the compact pipe. In fact, the segment could simply be cut off from a compact pipe similar as the one to be installed. The fusion joining process is then facilitated due to the fact that two pipe ends having the same—C- or heart-shaped—cross sectional area can be fusion joined together.

In case the device also encompasses the sleeve and the plate just described, the device would therefore be comprised of the adapter, the sleeve accommodating the adapter, the plate fusion joined to the sleeve, and the CP segment fusion joined to the opposite side of the plate.

On the other hand, the above object is solved by a method for preparing a CP for being installed into a pipeline comprising the features of claim 10. The method includes the step of fixing an adapter to a first end of the compact pipe, wherein the adapter comprises means for releasably connecting a connecting piece to the adapter.

Preferred optional features of the claimed method are recited in the dependent method claims.

In a manner known as such, the compact pipe is preferably folded from a circular cross-sectional shape into a shape having a non-circular cross section, e.g. into substantially the shape of a heart, before installing the CP within the pipeline. In the method of the invention, the folding is done prior to fixing the adapter to the first end of the compact pipe.

If the adapter is arranged within a sleeve which in turn is fixed to the first end of the compact pipe, possibly via a plate, the fixing of the plate to the compact pipe and/or the fixing of the adapter to the plate is preferably effected by fusion joining. In case the device, alternatively or in addition, includes the compact pipe segment, the fixing of the compact pipe segment to the compact pipe is preferably also effected by fusion joining. However, many other ways of connecting these elements are conceivable.

Finally, a method for installing a CP within the pipeline includes the following steps in addition to the ones recited above:

connecting a pulling head to the adapter;

installing the compact pipe within the pipeline by pulling the compact pipe into the pipeline by means of the pulling head; and after installation of the compact pipe within the pipeline, disconnecting the pulling head from the adapter.

The method for installing a CP may further comprise the following additional steps:

after installation of the compact pipe within the pipeline, connecting a fluid inlet/outlet piece to the adapter;

introducing steam into the compact pipe in order to make it revert to an original shape which is different from the folded shape; and disconnecting the fluid inlet/outlet piece from the adapter.

The adapter may generally be fixed to the pulling end or the trailing end of the compact pipe. In both cases, the above steps may be taken for fixing the adapter to the respective end of the compact pipe.

According to a particularly preferred embodiment, adapters are employed, on the pulling end and on the trailing end of the compact pipe. Also in this case, the above steps may be taken for fixing the adapter to each of the two ends of the compact pipe. Furthermore, in this case, the method preferably includes the following steps:

fixing an adapter to a pulling end of the compact pipe, connecting a pulling head to the adapter;

installing the compact pipe within the pipeline by pulling the compact pipe into the pipeline by means of the pulling head, cutting the compact pipe at a trailing end thereof;

fixing an adapter to the trailing end of the compact pipe, disconnecting the pulling head from the adapter, connecting fluid inlet/outlet pieces to the adapters on both ends of the compact pipe; and guiding steam through the compact pipe by means of the fluid inlet/outlet pieces in order to make the compact pipe revert to an original shape which is different from the folded shape.

The method may further include the subsequent step of guiding compressed air through the compact pipe by means of the fluid inlet/outlet pieces in order to cool the compact pipe.

The method may also include the subsequent step of cutting adapters from both ends of the compact pipe.

The use of an adapter on both the pulling end and the trailing end of the compact pipe provides the advantage that the process becomes as time efficient as possible, and that the steam inlet area becomes as large as possible (at least if the CP segment is used as one of the intermediate elements).

DETAILED DESCRIPTION OF PREFERRED EMBODIMENTS

Figure 1:
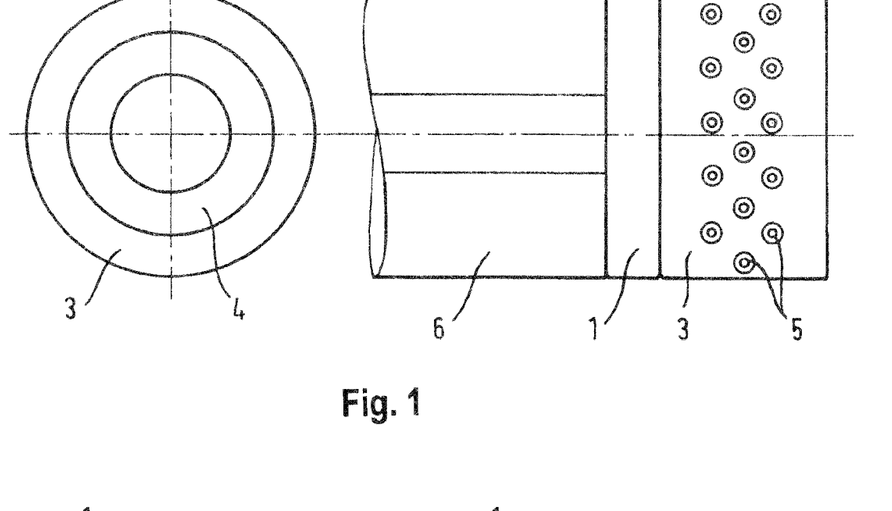
FIG. 1 shows a preferred embodiment of a device for installing a CP into an existing pipeline according to the present invention.

FIG. 1 shows a preferred embodiment of a device for installing a CP into an existing pipeline according to the present invention (front view and side view), in a state in which the device has been attached to the pulling end of the CP.

The device includes, as a first constituent, a segment 6 of a compact pipe which is arranged and constructed to be fusion joined to the free end or pulling end of the CP to be installed. The CP segment 6 could, for example, have simply been cut off from the free end of the CP to be installed, or from the end of a similar CP. In any event, the segment 6 should have the same outer diameter and cross section as the actual CP and be made from the same material.

The device further includes a circular PE-plate 1 which has been attached to one end of the folded CP segment 6 by fusion joining, and a cylindrical sleeve part 3 which in turn has been fixed to the side of the plate 1 facing away from the CP segment 6, also by fusion joining. Into the circular sleeve part 3, an adapter 4 is concentrically inserted which is made from metal (steel or stainless steel) and provided with an internal thread.

Other than in the prior art, where the pulling head was non-detachably fixed to the pulling end of the CP by fusion joining and cut off after the installation was completed, the adapter 4 allows a multitude of different connecting pieces to be releasably connected with the pulling end of the CP. The connecting pieces can have an arbitrary shape and function, as long as they have a thread mating with the internal thread formed in the adapter 4. In particular, a pulling head or a fluid inlet/outlet piece could be connected to the adapter 4, as will be explained further below.

First of all, however, it will be explained how exactly the adapter 4 of the present embodiment is fixed to the pulling end of the CP, using the sleeve 3, the plate 1, and the CP segment 6.

In a first step, a circular PE plate is provided which has a diameter at least slightly exceeding the outer diameter of the folded CP. In addition, a cylindrical sleeve 3 is provided which is suitably made from the same material as the compact pipe, e.g. polyethylene (PE). Since the circular front face of the sleeve 3 is to be fusion joined to one side of the plate 1, and a first end face of the folded CP segment 6 is to be fusion joined to the opposite side of the plate 1, the outlines of the sleeve 3 and of the CP are sketched onto the plate 1. The outer diameter of the plate 1 is then reduced by cutting along a circular line running slightly radially outward of the outline of the sleeve 3, so as to obtain a plate 1 having a diameter slightly larger than that of the sleeve 3.

In a second step, the opening 2 is provided in the plate 1 by cutting along the line designating the course of the inner wall of the folded CP segment 6.

Figure 2A:
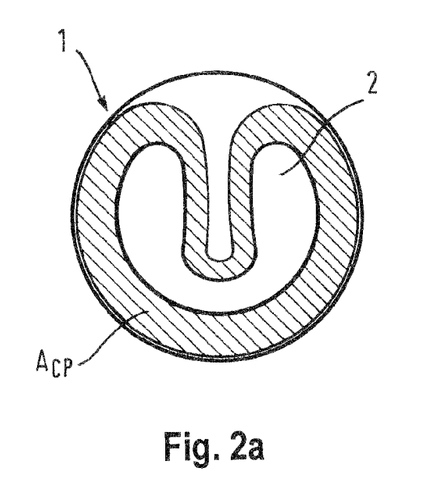
FIG. 2a shows a first side of a PE plate used in the device of FIG. 1.

FIG. 2a shows a first side of the PE plate 1, which is the side facing the CP segment 6 in the mounted state of the plate 1. The area $A_{CP}$, where the end face of the CP segment 6 abuts, is hatched.

Figure 2B:
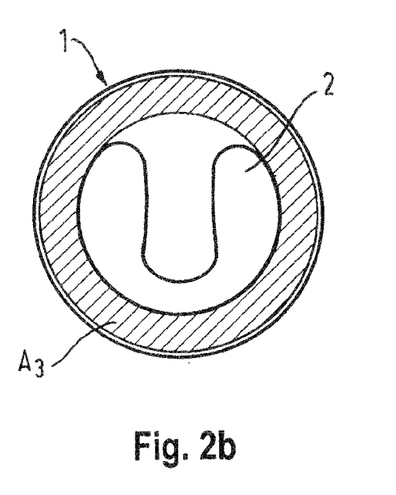
FIG. 2b shows an opposite, second side of the PE plate used in the device of FIG. 1.

FIG. 2b shows the opposite, second side of the PE plate 1, which is the side facing the sleeve part 3 in the mounted state of the plate 1. The area $A_3$, where the end face of the sleeve 3 abuts, is hatched.

In FIGS. 2a and 2b, an opening 2 is apparent which is cut into the plate 1 and has a shape corresponding to the shape of the internal wall of the CP segment 6 in the folded state. In other words, this opening 2 is as large as the open area of the cross section of the CP segment 6. Other than in the conventional method, in which the relatively small steam inlet and outlet holes were drilled into the respective PE-plates, there is one large opening 2 where the steam for heating the CP and the compressed air for cooling the CP flow through.

With regard to the dimensions of the individual elements, these are suitably adapted to the dimensions of the pipeline to be renovated and the CP used. For example, for installing a DN 200 compact pipe in its folded state, a DN 160 sleeve would be used, since the outer diameter of a DN 160 sleeve substantially corresponds to the outer diameter of the folded CP. As already explained, the CP segment 6 has the same outer diameter and cross section as the actual CP (the outer diameter of the CP segment 6 being e.g. about 155 mm for use with a DN 160 sleeve). The circular plate 1 would suitably have a thickness of 30 mm and, in the mounted state, the same diameter as the folded CP segment 6 and the sleeve 3.

In a third step, the plate 1 with the opening 2 formed therein is connected with the end face of the folded CP segment 6 by fusion joining. The fusion joining can be done more quickly than in the prior art: since the opening 2 has been formed beforehand, there is less plastic to be heated.

During fusion joining, the opening 2 becomes smaller due to the formation of a so-called fusing rail. Therefore, the opening 2 is preferably re-opened after fusion joining the plate 1 to the end face of the CP segment 6.

In a fourth step, the opposite side of the plate 1 is connected with the circular front face of the sleeve 3 by fusion joining. Also this fusion joining process can be done more quickly than in the prior art, since there is less plastic to be heated. After this fusion joining step, the opening 2 is re-opened again in case a fusing bead has been formed.

In a fifth step, the outer circumference of the plate 1 is shaved so as to provide a flush surface of the CP segment 6, the plate 1, and the sleeve 3.

The metal adapter 4 is then inserted into the hollow cylindrical sleeve 3. The outer diameter of the adapter 4 substantially corresponds to the internal diameter of the sleeve 3. A heat resistant sealant as well as a series of bolts or rivets 5 are used in order to securely mount the adapter 4 within the sleeve 3, the rivets penetrating the sleeve 3 and the adapter 4 in the radial direction. In the sleeve 3 and the adapter 4, respective through holes are formed for accommodating the rivets 5.

Figure 3:
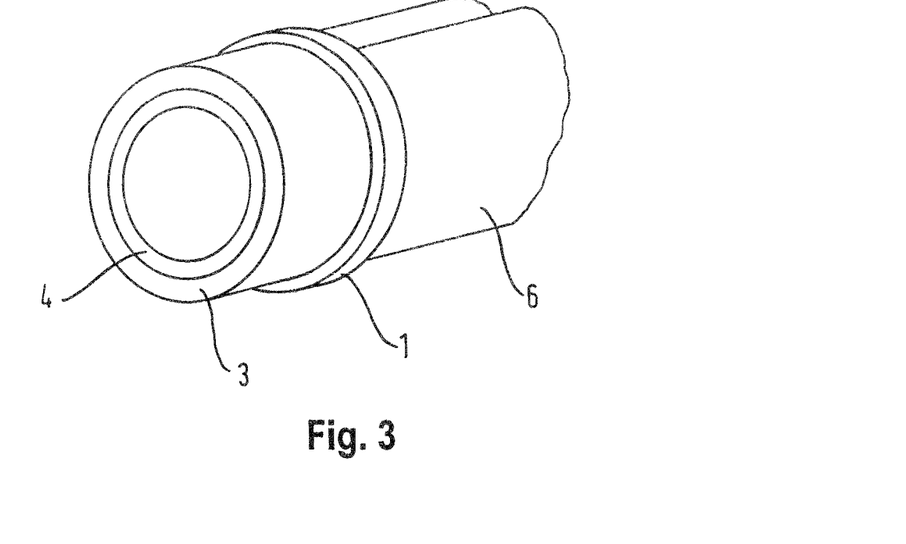
FIG. 3 is a perspective view of the device.

FIG. 3 shows the resultant device once again in a perspective view.

Finally, the free end face of the CP segment 6 is attached to the pulling end of the CP by fusion joining.

Figure 4A:
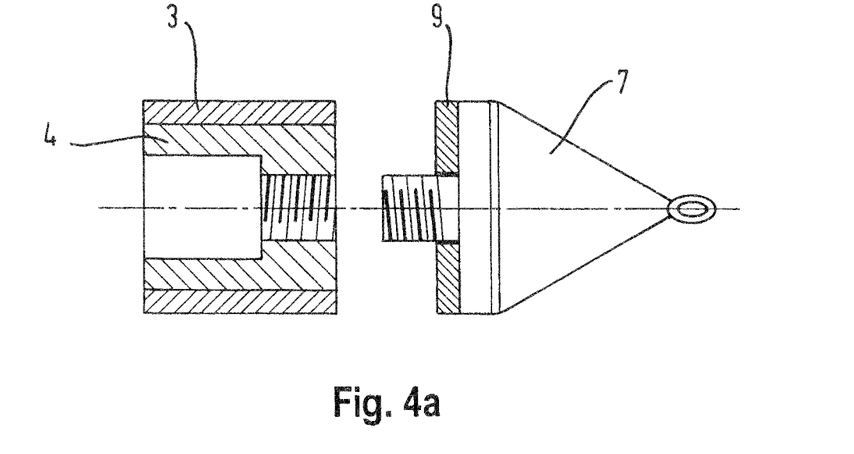
FIGS. 4a through 4c show three different embodiments of adapters, any of which may form part of the device.
Figure 4B:
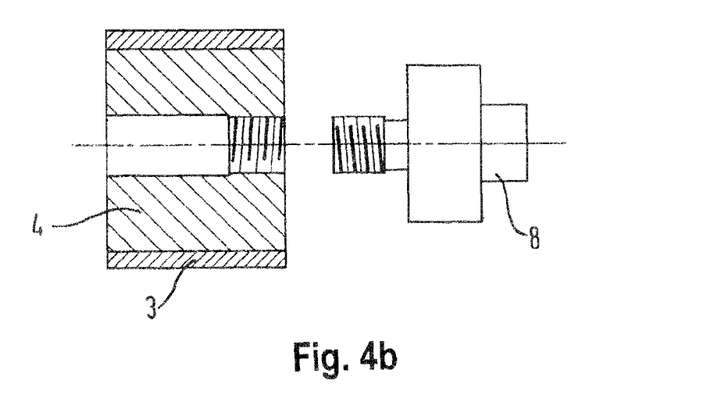
Figure 4C:
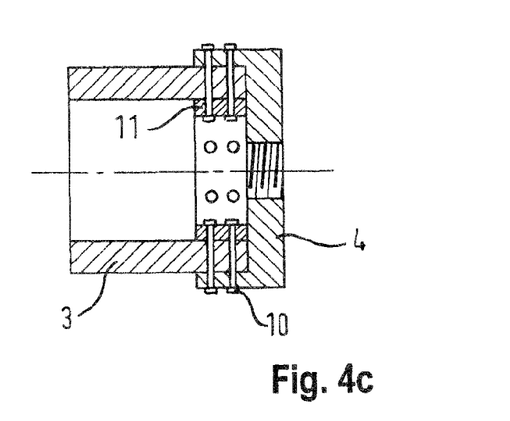

FIGS. 4a through 4c show three different possibilities for constituting the adapter 4.

In both FIG. 4a and FIG. 4b, the sleeve 3 is placed about the outer circumference of the adapter 4. FIG. 4a also shows a locking ring 9 with an internal thread which is used for fixing the pulling head 7 to the adapter 4 to prevent unscrewing during the subsequent pulling operation.

In contrast, in FIG. 4c, the adapter 4 is positioned about the outer circumference of the sleeve 3 and connected to the sleeve 3 by fixing means 10 as well as a bush 11 which is placed within the sleeve 3. One advantage of this configuration is that it is easy to assemble in comparison with the configuration where the sleeve 3 is placed about the outer circumference of the adapter 4.

The adapter of FIG. 4a is shown together with a pulling head 7, while the adapter 4 of FIG. 4b is illustrated in combination with a fluid inlet/outlet piece 8. It is, however, to be understood that any of the adapters shown in FIGS. 4a through 4c can be used together with the pulling head 7, the fluid inlet/outlet piece 8, or other connecting pieces as the need arises.

In all the examples according to FIGS. 4a through 4c, the adapter 4 is provided with an internal thread for connecting the connecting pieces. An external thread on the connecting piece, e.g., the pulling head 7 in FIG. 4a, mates with the internal thread. The threads may for example be 2.5" threads.

Instead of the thread connection, other means for releasably connecting the connecting pieces may be provided, e.g. bayonet connection or a click mechanism.

Figure 5:
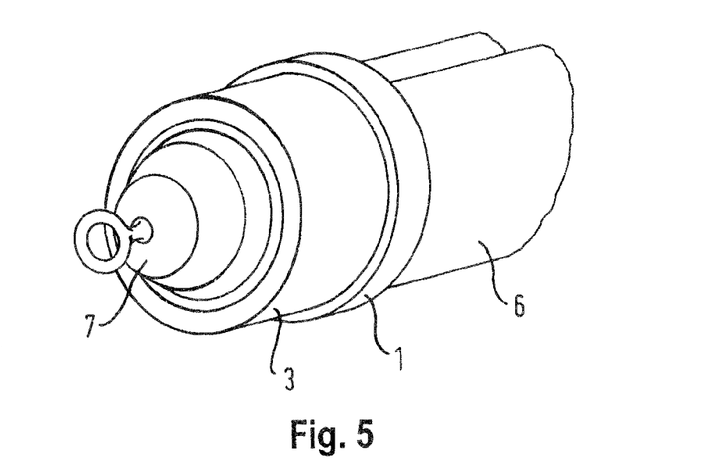
FIG. 5 shows the device with a pulling head connected to the adapter.

Once the device of one of the above embodiments has been fixed to the pulling end of the CP, the device is used as follows for installing the CP within an existing, damaged pipeline:

First of all, a connecting piece in the form of a pulling head is attached to the adapter 4 by screwing. FIG. 5 shows the device with a pulling head 7 connected to the adapter 4.

Subsequently, the CP is pulled into the existing pipeline. This is done substantially as in the conventional method, i.e. as outlined above with reference to FIG. 7. After installation of the CP, however, the pulling head does not have to be cut off from the pulling end of the CP, but can be removed by unscrewing from the adapter 4.

Figure 6:
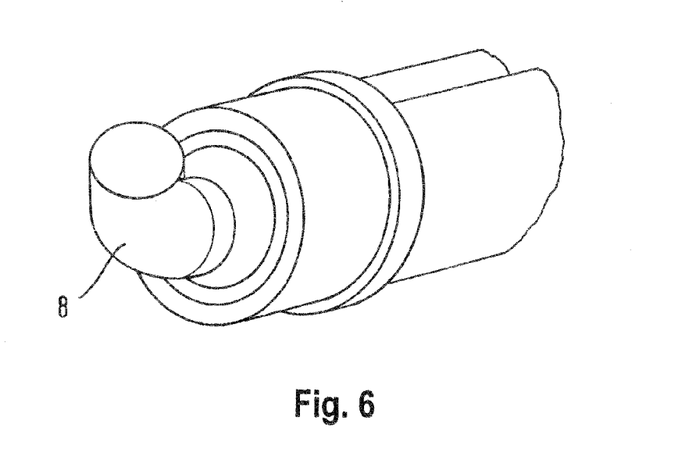
FIG. 6 shows the device with a fluid inlet/outlet piece connected to the adapter.

Subsequently, another connecting piece in the form of a fluid inlet/outlet piece is screwed onto the adapter 4 at the pulling end of the CP. FIG. 6 shows the device with a fluid inlet/outlet piece 8 connected to the adapter 4.

At the trailing end of the compact pipe, the compact pipe is cut, and an adapter 4 is attached to the trailing end in the same manner as it has been described above for the pulling end. A fluid inlet/outlet piece is attached to the adapter 4 on the trailing end. Conduits (hoses) are connected with the fluid inlet/outlet pieces, and steam is introduced into the compact pipe and applied to the inside of the CP so as to make it revert to its original shape.

After the steaming process, the fluid inlet/outlet pieces remain connected to the adapters 4 and are also used for introducing compressed air via the conduits into the expanded CP so as to cool the CP.

It becomes clear that dependent on the flow direction of the steam or compressed air, the fluid inlet/outlet pieces serve as a steam inlet or a steam outlet or a compressed air inlet or outlet, respectively.

As soon as the compact pipe has been cooled sufficiently, the air conduits are removed from both ends of the compact pipe.

In a final step, the devices are cut off from the pulling and the trailing end of the CP. The cuts may be made so that the devices can be used again, e.g. by making the cut through the respective compact pipe segments 6.

Thanks to the inserted CP, which fits close to the inner wall of the pipeline, the pipeline has become fully functional again and can be re-connected to the existing network.

The invention is not restricted to the above embodiment, but can be modified within the scope of the appended claims.

In particular, in the above embodiment, the adapter 4 is fixed to the end of the CP via the sleeve 3, into which it is concentrically inserted, the plate 1, and the CP segment 6. The present invention, however, also encompasses solutions in which an adapter is fixed to the end of the CP in a different manner than described above, and/or in which the adapter has a constitution different from the one described above, as long as the adapter comprises means for releasably connecting a connecting piece thereto.

For example, one could think of modifying the device insofar as the plate 1 is fusion joined directly with the pulling end of the CP, without providing the CP segment 6 there between.

Furthermore, in the above embodiment, the device is used on both the pulling and the trailing ends of the CP. Alternatively, the device of the invention can, however, be used at only the pulling end or only the trailing end of the CP.

The invention claimed is:

1. A device for installing a compact pipe within a pipeline, the device including:
   an adapter comprising means for releasably connecting a connecting piece to the adapter, and
   means for fixing the adapter to a first end of the compact pipe,
   wherein the means for fixing the adapter to the first end of the compact pipe includes intermediate elements constructed and arranged to be fixed to the adapter and constructed and arranged to be fusion-joined to the first end of the compact pipe,
   wherein the intermediate elements include at least
   a sleeve for being fixed to the adapter, and
   a plate contacting a circular end face of the sleeve and provided for being fusion-joined to the first end of the compact pipe.

2. The device of claim 1, in which the means for releasably attaching a connecting piece include a screw thread.

3. The device of claim 2, in which the adapter has the shape of a hollow cylinder, and the means for releasably attaching a connecting piece are constituted by an internal thread on at least part of the inner circumferential surface of the adapter.

4. The device of claim 1, in which the sleeve and the adapter are cylindrical, and the adapter is concentrically inserted into the sleeve and fixed thereto.

5. The device of claim 1, in which the plate is formed with an opening connecting the interior of the adapter with the interior of the compact pipe, the opening having a shape which substantially corresponds to the open area of the cross section of compact pipe when in a folded state.

6. The device of claim 1, further comprising a compact pipe segment which is arranged and constructed for being fixed to the first end of the compact pipe and wherein the compact pipe segment is arranged and constructed to be fusion joined to the plate such that the compact pipe is fusion joined to the plate via the compact pipe segment.

7. The device of claim 1, wherein the adapter and the means for connecting the adapter with the compact pipe are constructed so as to allow a communication between the interior of the adapter with the interior of the compact pipe.

8. A method for preparing a compact pipe for being installed within a pipeline, the method comprising:
   providing an adapter having means for releasably connecting a connecting piece to the adapter,
   fixing a sleeve to the adapter,
   contacting a plate to a circular end face of the sleeve, and
   fusion-joining the plate to a first end of the compact pipe.

9. The method of claim 8, further comprising folding the compact pipe from a circular cross-sectional shape into a shape having a non-circular cross section before fusion-joining the plate to the first end of the compact pipe.

10. The method of claim 9, further comprising cutting an opening into the plate, the opening having a shape which substantially corresponds to the open area of the cross section of compact pipe when in a folded state.

11. The method of claim 8, wherein fusion-joining the plate to the first end of the compact pipe comprises fusion-joining a compact pipe segment to the first end of the compact pipe and fusion-joining the compact pipe segment to the plate.

12. A method of installing a compact pipe prepared in the method of claim 8 within a pipeline, the method of installing the compact pipe within the pipeline including
connecting a pulling head to the adapter;
installing the compact pipe within the pipeline by pulling the compact pipe into the pipeline by means of the pulling head; and
after installation of the compact pipe within the pipeline, disconnecting the pulling head from the adapter.

13. The method of claim 12 further comprising
after installation of the compact pipe within the pipeline, connecting a fluid inlet/outlet piece to the adapter;
introducing steam into the compact pipe in order to make it revert to an original shape which is different from a shape of the compact pipe when in a folded state; and
disconnecting the fluid inlet/outlet piece from the adapter.

14. The method of claim 8, further comprising fixing the adapter to one of the pulling end and the trailing end of the compact pipe.

15. The method of claim 14, further comprising fixing a second adapter to the other one of the pulling end and the trailing end of the compact pipe.

16. A method of installing a compact pipe prepared in the method of claim 15 within a pipeline, the method of installing the compact pipe within the pipeline, including
fixing the adapter to a pulling end of the compact pipe;
connecting a pulling head to the adapter;
installing the compact pipe within the pipeline by pulling the compact pipe into the pipeline by means of the pulling head;
cutting the compact pipe at a trailing end thereof;
fixing the second adapter to the trailing end of the compact pipe;
disconnecting the pulling head from the adapter;
connecting fluid inlet/outlet pieces to the adapters on both ends of the compact pipe; and
guiding steam through the compact pipe by means of the fluid inlet/outlet pieces in order to make the compact pipe revert to an original shape which is different from a shape of the compact pipe when in a folded state.

17. The method of claim 16, further including guiding compressed air through the compact pipe by means of the fluid inlet/outlet pieces in order to cool the compact pipe.

18. The method of claim 16, further including cutting the adapters from both ends of the compact pipe.

* * * * *